United States Patent [19]
Ooie

[11] Patent Number: 5,592,242
[45] Date of Patent: Jan. 7, 1997

[54] EYEGLASS CONNECTION DEVICE

[75] Inventor: Yuzuru Ooie, Higashi-Osaka, Japan

[73] Assignee: O.G.K. Hanbai Co., Ltd., Osaka, Japan

[21] Appl. No.: 454,312

[22] PCT Filed: May 27, 1994

[86] PCT No.: PCT/JP94/00849

§ 371 Date: Jun. 19, 1995

§ 102(e) Date: Jun. 19, 1995

[87] PCT Pub. No.: WO95/12139

PCT Pub. Date: May 4, 1995

[30] Foreign Application Priority Data

Oct. 29, 1993 [JP] Japan ..................................... 5-294038

[51] Int. Cl.$^6$ .............................. G02C 7/10; G02C 1/08; G02C 1/04; G02C 1/02
[52] U.S. Cl. ............... 351/44; 351/92; 351/105; 351/110
[58] Field of Search .................... 351/41, 44, 86, 351/92, 96, 103, 105, 106, 110, 111, 118, 119, 140, 143, 147, 149, 158, 62, 122, 154

[56] References Cited

U.S. PATENT DOCUMENTS

| 4,563,066 | 1/1986 | Bononi ................................. 351/123 |
| 4,666,266 | 5/1987 | Morrison .............................. 351/111 |
| 5,387,949 | 2/1995 | Tackles ................................. 351/44 |

FOREIGN PATENT DOCUMENTS

61-201023  12/1986  Japan .
64-4418    1/1989   Japan .

Primary Examiner—Huy Mai

[57] ABSTRACT

Sunglasses include a lens which is replaceable with an alternative one at any time, and provides such sunglasses in which frames thereof can be easily attached to and detached from the lens, and the frames can be held stably on the lens while attached thereto, and which provide a user with a good wear feeling. The sunglasses of the present invention include a lens, frames detachably mounted on the respective mounting portions of the lens; and temples attached to the respective frames. When the frames are mounted on the respective mounting portions, holding pieces of each of the frames hold therebetween the corresponding mounting portion, while an elongated protrusion and projection of each of the frames are engaged with an engagement long nick or slot and an engagement hole in the lens, respectively.

20 Claims, 10 Drawing Sheets

EYEGLASS CONNECTION DEVICE

TECHNICAL FIELD

The present invention relates to sunglasses being provided with a lens of the single-lens type.

BACKGROUND ART

Recent years have seen, especially on the occasion of the playing sports, the frequent use of sunglasses having: a lens of single-lens type made of a plastic resin such as polycarbonate, frames mounted on both side edges of the lens, and temples attached to the respective frames. With some of these sunglasses, a user can selectively change parts such as lenses or frames in order to coordinate their colors and designs suitably for occasions and purposes.

Figure 12:
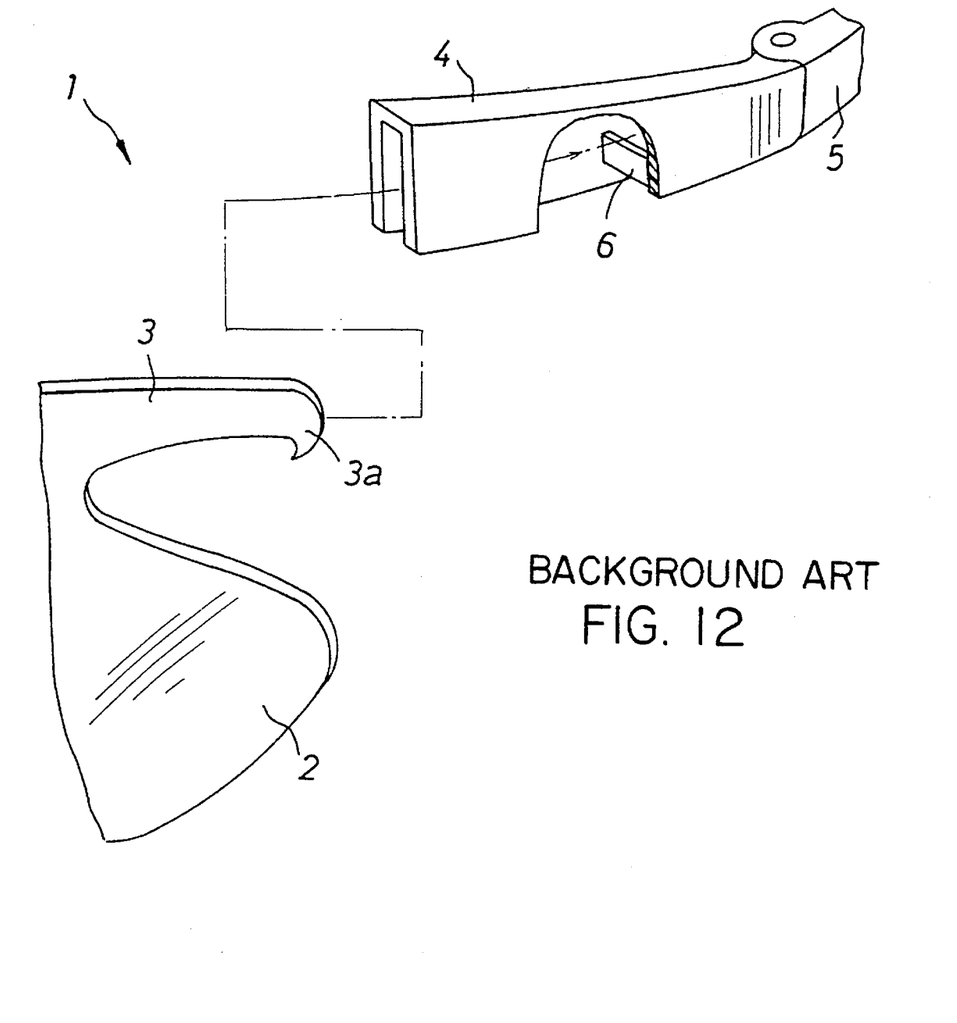
FIG. 12 is a view illustrating the background art described above.

FIG. 12 shows a typical mounting structure of frames and a lens adopted in such sunglasses. Opposite upper side edges of a lens 2 of sunglasses 1 are provided with their respective mounting elements 3 each having its tip portion 3a formed into a hook. Each of a pair of frames 4 is in the form a U-shaped flume with its opening facing downward. A temple 5 is attached to one end in the longitudinal direction of each of the frames 4 and pivotally supported thereby. At the midpoint of each of the frames 4 is provided an engagement piece 6 so that it is held between the opposed inner walls of the corresponding frame 4. Each of the mounting elements 3 is inserted into the frame 4 from the side of the other end in the longitudinal direction of the frame 4, so that the above tip portion 3a comes to mesh with the engagement piece 6.

In the sunglasses 1 with such a mounting structure, although the frames 4 can easily be mounted on or dismounted from the lens 2 (by so-called one-touch operation), if the tip portion 3a is accidentally disengaged from the engagement piece 6, the mounting element 3 of the lens 2 slips down through the downside opening of the frame 4. In short, the frames 4 easily come off the lens 2 by accident, which presents a problem to be solved.

SUMMARY OF THE INVENTION

An object of the present invention is to provide sunglasses with enhanced usability in which frames can easily be mounted on and dismounted from a lens, while they are less likely to come off the lens by accident.

The present invention includes a lens of the single-lens type made of a plastic resin, a pair of frames mounted on opposite upper side edges of the lens, and a pair of temples pivotally supported by the pair of respective frames. Each of the upper side edges of the above lens is provided with an engagement hole and an engagement long nick substantially horizontally extending and having an open outer end. Each of the above frames is provided with a pair of holding pieces for holding therebetween one of the upper side edges of the lens. An inner face of either one of the holding pieces is provided with a projection to be engaged with the above engagement hole. An elongated protrusion is provided between the holding pieces so as to be engaged with the above engagement long nick.

According to the present invention, in mounting a frame on the lens, one of the upper side edges of the lens is inserted into the space between the holding pieces of the frame, while the elongated protrusion of the frame is engaged with the corresponding engagement long nick of the lens, thereby moving the frame toward the interior of the lens and engaging the projection of the frame in the corresponding engagement hole of the lens. Consequently, the holding pieces of the frame hold therebetween the side edge of the lens, while having the elongated protrusion of the frame engage with the engagement long nick of the lens, and having the projection of the frame engage in the engagement hole of the lens. As a result, the shifting of the frame both toward the interior of the lens and in the vertical direction of the lens is restrained, so that the frame is stably held on the lens.

In dismounting the frame from the lens, on the other hand, the projection is pulled out of the engagement hole by pushing apart the holding pieces and then the elongated protrusion is pulled out of the engagement long nick, while the frame is moved toward the exterior of the lens, thereby dismounting the frame from the lens.

The projection is advantageously formed into a substantially hemispherical configuration. According to the present invention, the operation of fitting the projection into the engagement hole and the operation of pulling the projection out of the engagement hole can be performed easily without damaging the lens.

The sunglasses are advantageously constituted such that the elongated protrusion extends with the tip thereof reaching about the midpoint of each of the holding pieces and that the projection is provided in a position slightly closer to the free ends of the holding pieces than to the above tip. According to the present invention, an undesired shift of the entire frame is restrained so that the frame is held securely on the lens. Moreover, since the free ends of the holding pieces are provided with no elongated protrusion and no projection, the side edge of the lens is smoothly inserted into the space between the holding pieces in mounting the frame on the lens. Furthermore, even if the free ends of the holding pieces are pushed apart for any undesired reason, the projection is less likely to come off the engagement hole simultaneously.

The projection is preferably provided in a position deviated from the extension line of the elongated protrusion. According to the present invention, even if the projection is accidentally disengaged from the engagement hole, the projection is less likely to come off the engagement long nick simultaneously.

Vent holes are advantageously formed in the respective base ends of the temples along the length of the temples. According to the present invention, the sunglasses are excellent in ventilation and produce a feeling of comfortableness when worn by a user.

The sunglasses are advantageously constituted such that the respective free ends of the temples are detachably provided with non-slip covers made of an elastic material with long holes formed in the outer sides thereof along the length of the temples, and that the free ends of the temples are formed with elongated protrusions, which are fitted into the corresponding long holes and become substantially flush with the outer faces of the covers when the covers are attached thereto. According to the present invention, the non-slip covers provided on the free ends of the temples prevent the falling of the sunglasses while they are worn. In addition, the long holes formed in the respective outer sides of the covers enable easy attachment and detachment of the covers and prevent the accidental shifting and coming off of the covers. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope for the invention will become apparent to those skilled in the art from this detailed description.

BRIEF DESCRIPTION OF DRAWINGS

The present invention will become more fully understood from the detailed description given hereinbelow and the accompanying drawings which are given by way of illustraion only, and thus are not limitative of the present invention, and wherein.

DESCRIPTION OF THE PREFERRED EMBODIMENT

Figure 1:
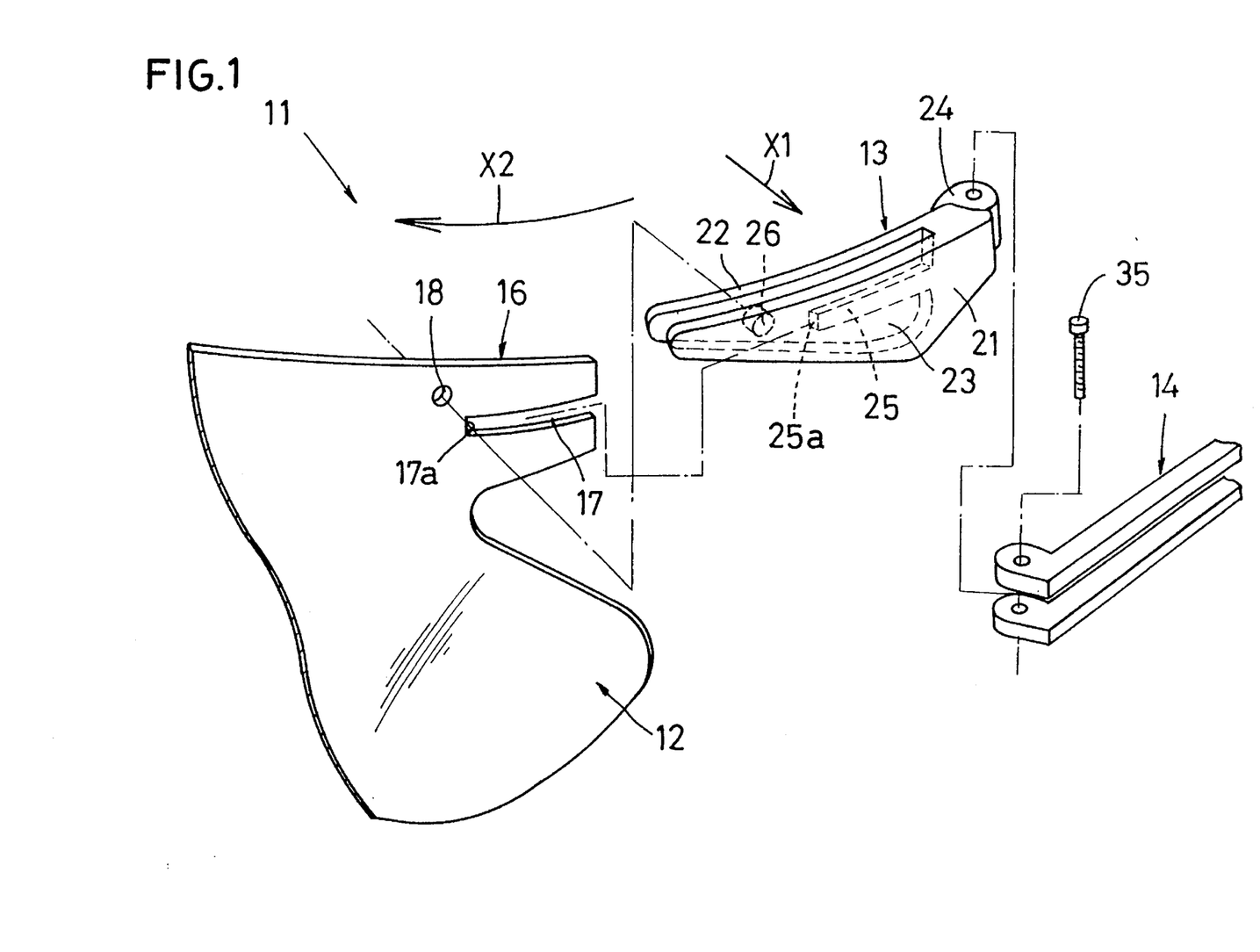
FIG. 1 is an exploded perspective view of sunglasses according to an embodiment of the present invention.

As shown in FIG. 1, sunglasses 11 include a lens 12; a pair of right and left frames 13; and a pair of right and left temples 14. The lens 12 is composed of a single plate lens made of a translucent plastic material, such as polycarbonate, and is slightly warped so as to fit the facial configuration of a user. The upper edge of the lens 12 is formed substantially horizontal. The lower central portion in the longitudinal direction of the lens 12 is formed with a V-shaped notch. If required, an inner frame 15 separately formed from a plastic resin or rubber is mounted around the central portion of the lens 12.

Opposite side edges of the lens 12 are also formed with their respective V-shaped notches. The projecting portions above the respective notches are intended to serve as mounting elements 16 on which frames 13 are to be mounted. The frames 13 will be described later.

At about the midpoint in the vertical direction of each of the mounting elements 16 is provided an engagement long nick or slot 17 extending substantially horizontally and having an open end at the corresponding side edge. The mounting element 16 is also provided with a substantially circular engagement hole 18 in a position interior to the tip 17a of the engagement long nick 17 and slightly above the extension line of the engagement long nick 17.

Figure 2A:
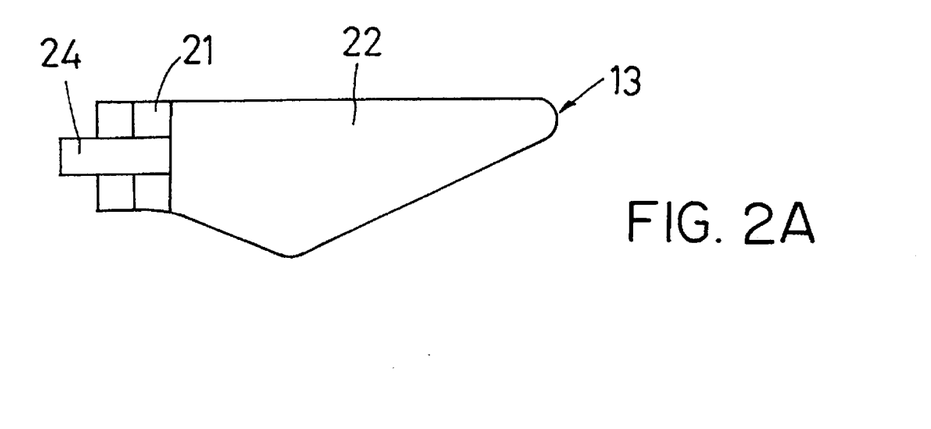
FIG. 2(a), (b) & (c) show views showing a frame.
Figure 2B:
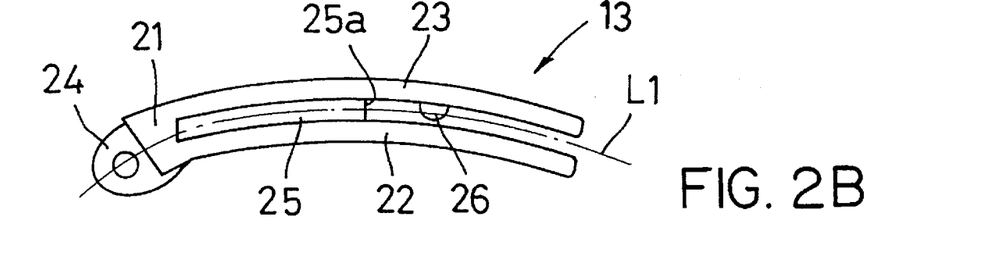
Figure 2C:
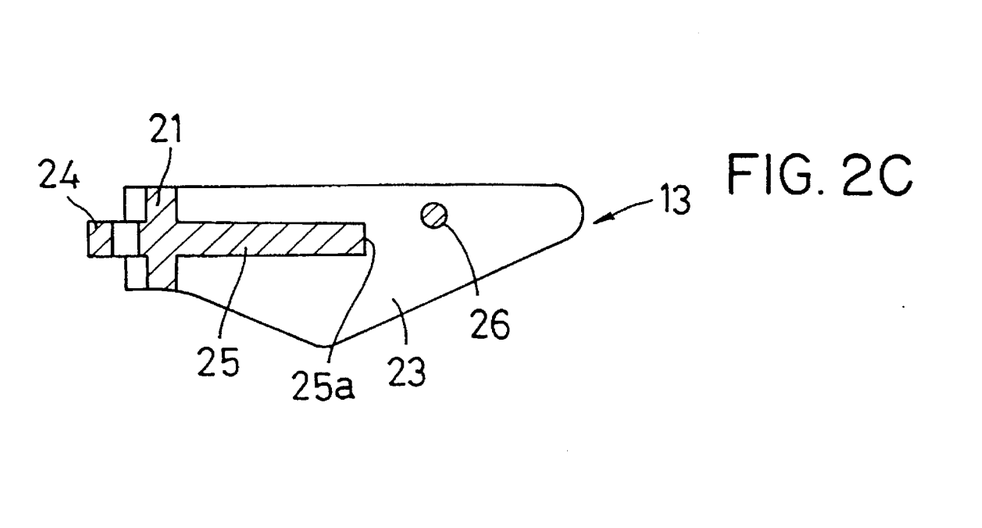

The frame 13 is made of an elastic material such as a synthetic resin. FIG. 2(A) shows the frame 13 when viewed from the direction indicated by the arrow X1 in FIG. 1 (i.e., from the side of the user's face wearing the sunglasses). FIG. 2(B) shows the frame 13 when viewed from above. FIG. 2(C) is a cross section taken along the center line in the direction of the thickness of the frame 13 in FIG. 2(B).

The frame 13 includes a base 21; a pair of holding pieces 22 and 23 which protrude side-by-side from the respective ends in the direction of the thickness of the base 21 toward the interior of the lens (downstream of the arrow X2); and a temple attachment piece 24 projecting outwardly from the base 21. Each of the holding pieces 22 and 23 presents a substantially triangular configuration in which the lower-edge profile is slightly inclined downward from the above base 21 and then upward.

At the midpoint between the both ends in the direction of the thickness of the above base 21 is provided an elongated protrusion 25 which is projecting into the space between the holding pieces 22 and 23. The length of the elongated protrusion 25 is determined such that the tip 25a thereof reaches about the midpoint of each of the holding members 22 and 23. The holding piece 23 positioned exterior to the lens (upstream of the arrow X2) is formed with a substantially hemispherical projection 26 which is projecting toward the other holding piece 22. The projection 26 is provided in a position slightly above the extension line of the elongated protrusion 25 and slightly closer to the interior of the lens than to the above tip 25a.

In mounting the frame 13 on the lens 12, the frame 3 is moved toward the interior of the lens, while the mounting element 16 is held between the holding pieces 22 and 3. In the process, the elongated protrusion 25 is slid along the inner face of the engagement long nick 17 until the tip 25a of the elongated protrusion 25 reaches the innermost end 17a of the engagement long nick 17, thereby engaging the elongated protrusion 25 in the engagement long nick 17, while fitting the projection 26 into the engagement hole 18. At this stage, the upper edge of the mounting element 16 of the lens 12 is substantially flush with the upper edge of the frame 13.

Figure 3:
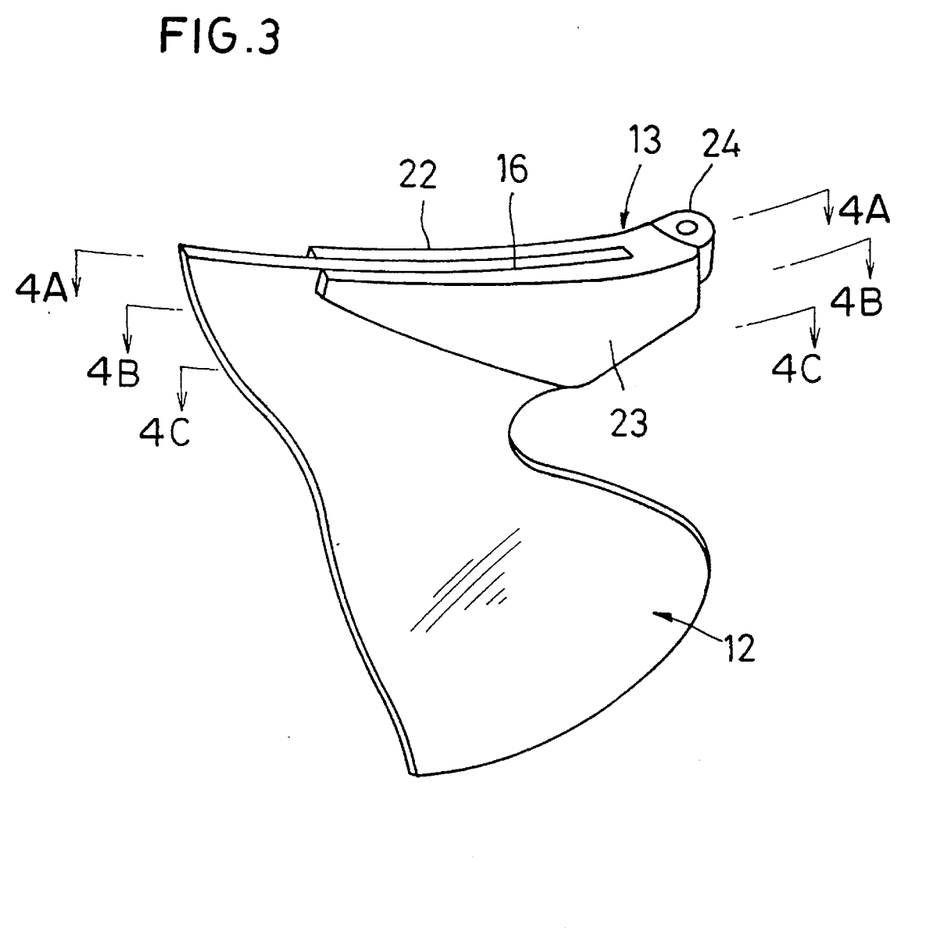
FIG. 3 is a view showing the frame that has been attached to a lens.
Figure 4A:
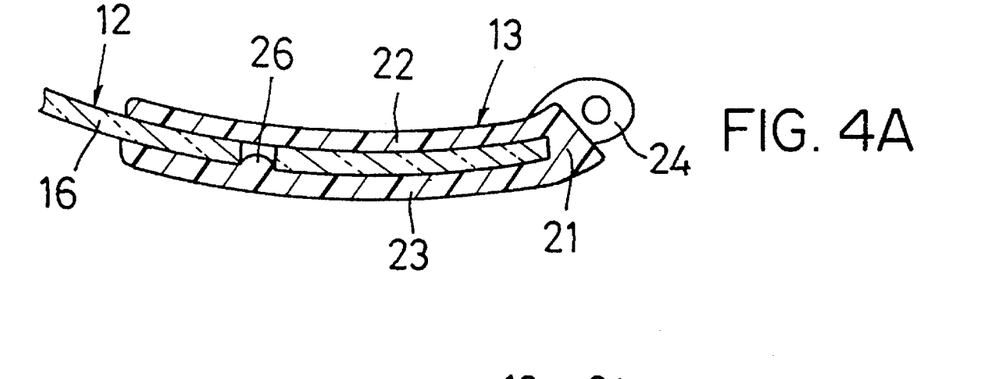
FIG. 4(a), (b), & (c) are cross sections of FIG. 3.
Figure 4B:
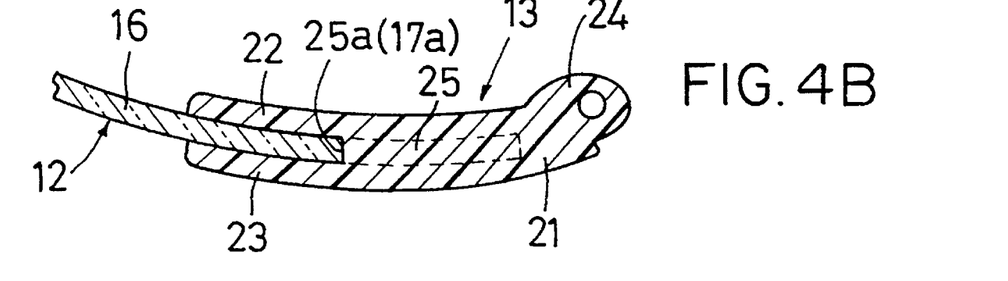
Figure 4C:
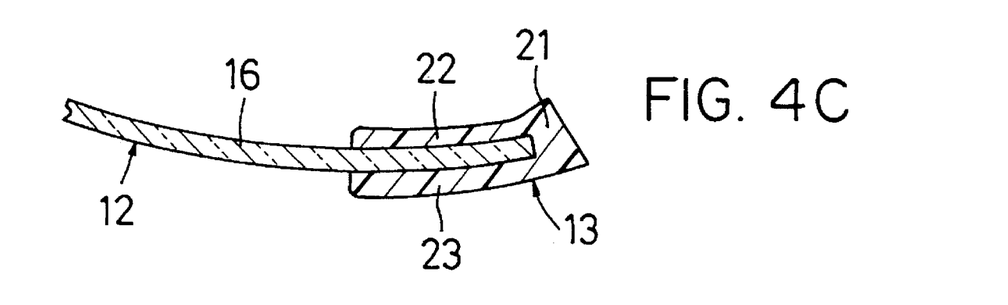
Figure 5:
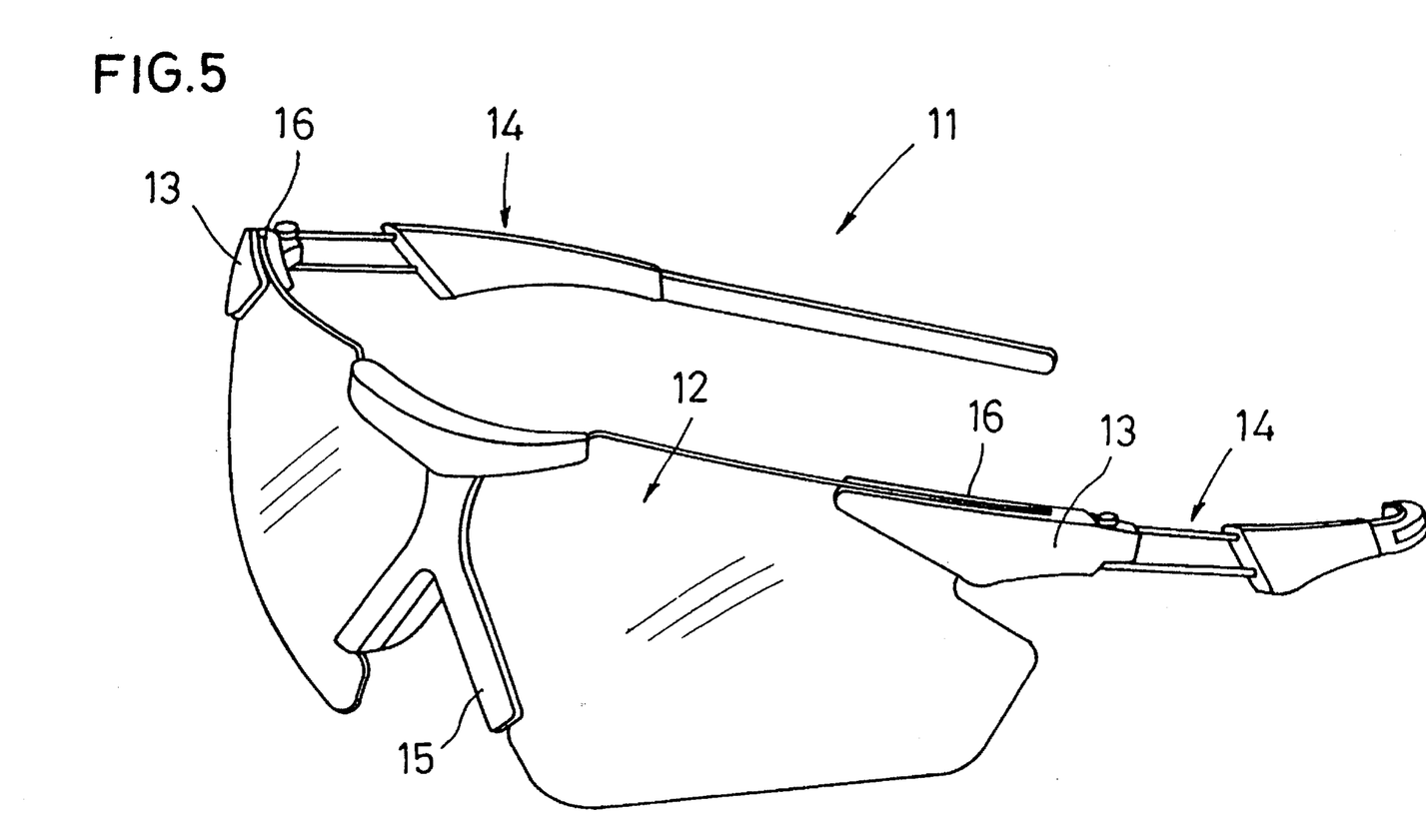
FIG. 5 is a perspective view showing sunglasses as a whole.

The lens 12 on which the frame 13 has been mounted is shown in FIG. 3. FIGS. 4A–4C are cross sections taken along the respective lines of FIG. 3, of which: FIG. 4(A) is a cross section taken along the line 4A—4A; FIG. 4B is a cross section taken along the line 4B—4B; and FIG. 4(C) is a cross section taken along the line 4C—4C.

In dismounting the frame 13 from the lens 12, on the other hand, the free ends of the holding pieces 22 and 23 are initially pushed wide apart against the elasticity of the holding pieces, thereby disengaging the projection 26 from the engagement hole 18. At this stage, the frame 13 is moved toward the exterior of the lens, thereby pulling the elongated protrusion 25 out of the engagement long nick 17.

In this manner, the mounting and dismounting of the frame 13 can be performed by so-called simple one-touch operation, which enables the user to change lenses and frames at his pleasure.

In addition, once the frame 13 has been mounted on the lens 12, it can be held stably on the lens 12. Specifically, the holding pieces 22 and 23 hold therebetween the mounting element 16, while the elongated protrusion 25 is engaged in the engagement long nick 17, thereby preventing the frame 13 from shifting in the vertical direction with respect to the lens 12. Moreover, since the projection 26 is engaged with the engagement hole 18, the frame 13 is prevented from shifting toward the exterior of the lens as well as in the vertical direction. Consequently, the frame 13 is less likely to be displaced or let fall from the mounting element 16 by the movement of the user or the like.

Furthermore, since such a mounting structure of the lens 12 and the frame 13 can easily be implemented by providing the mounting element 16 with the engagement hole 18 and elongated protrusion 17 and using the frame 13 integrally formed with the elongated protrusion 25 and projection 26, it is also advantageous in improving the efficiency of the manufacturing process.

With the above projection 26 formed into a substantially hemispherical configuration, the engagement and disengagement in and from the engagement hole 18 is easily carried out and hence the frame 13 can be mounted and dismounted on and from the lens 12 more smoothly. Moreover, the possibility of the lens 12 being damaged by the projection 26 in mounting and dismounting the frame 13 on and from the lens 12 is small. Furthermore, the projection 26 in a substantially hemispherical configuration is also advantageous in forming the frame because of the ease with which the resulting frame is withdrawn from its pattern.

Since the elongated protrusion 25 is provided not only from the vicinity of the base 21 but extensively from the base 21 to about the midpoint of each of the holding pieces 22 and 23, and the projection 26 is also provided in the vicinity of the midpoint of each of the holding pieces 22 and 23, once the frame 13 has been mounted on the lens 12, an undesired shift of the entire frame 13 is surely prevented. Moreover, since no elongated protrusion and no projection is provided in the vicinity of the free ends of the holding pieces 22 and 23, the mounting portion 16 can be smoothly inserted into the space between the holding pieces in mounting the frame 13 on the lens 12. Furthermore, the possibility of damaging the lens 12 is also small.

Since the projection 26 is provided in a position deviated from the extension line of the elongated protrusion 25, even when the projection 26 slips off the engagement hole 18, the possibility that the elongated protrusion 25 simultaneously comes off the engagement long nick 17 is small. Moreover, since the projection 26 is provided in the upper part of the holding piece, the operations of engaging and disengaging the projection 26 in and from the engagement hole 18 are easily performed.

Figure 6A:
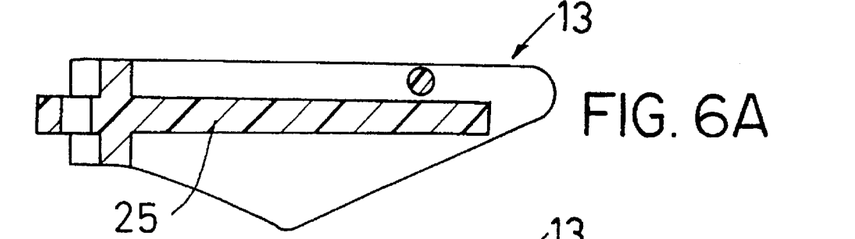
FIGS. 6(a), (b) & (c) are views showing variations of the present embodiment.
Figure 6B:
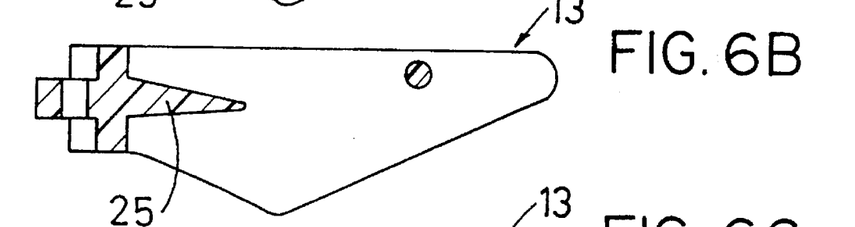
Figure 6C:
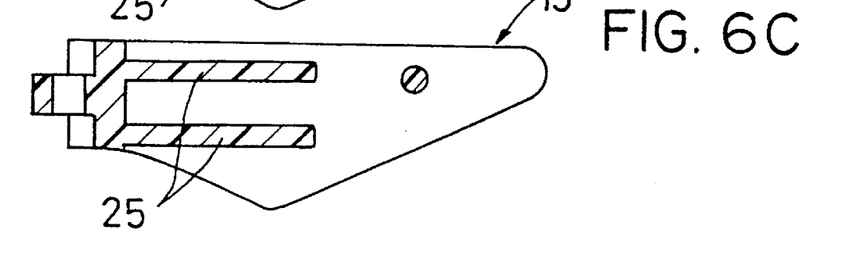

If required, the structure of the frame 13 and mounting element 16 can be changed appropriately in the present embodiment. Hence, the configuration of the frame 13 can be varied in accordance with the configuration of the mounting element 16. If required, the configuration of the elongated protrusion 25 can also be changed appropriately. For example, the elongated protrusion 25 may have a length reaching the vicinity of the free ends of the holding pieces, as shown in FIG. 6(A). Alternatively, the elongated protrusion 25 may have a length not reaching the midpoint of each of the holding pieces, as shown in FIG. 6(B). Alternatively, the elongated protrusion 25 may be tapered, as shown in FIG. 6(B). Alternatively, a plurality of elongated protrusions 25 may be provided, as shown in FIG. 6(C). In either case, the engagement long nick 17 is so configurated as to mesh with the elongated protrusion 25. The respective positions of the elongated protrusion 25 and engagement long nick 17 can also be changed, provided that they correspond to each other.

Figure 7A:
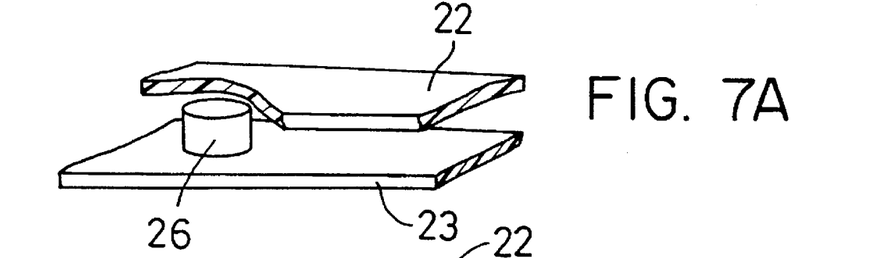
FIG. 7(a) & (b) are views showing variations of the present embodiment.
Figure 7B:
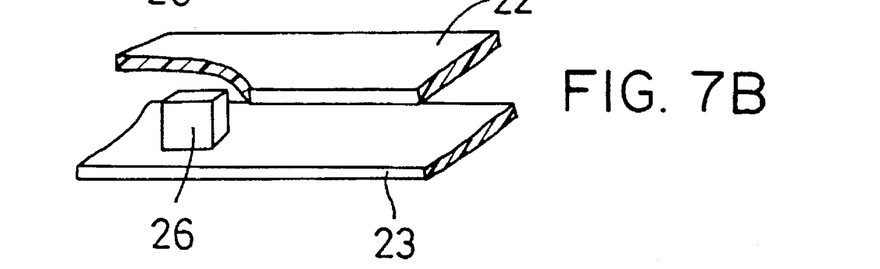
Figure 8A:
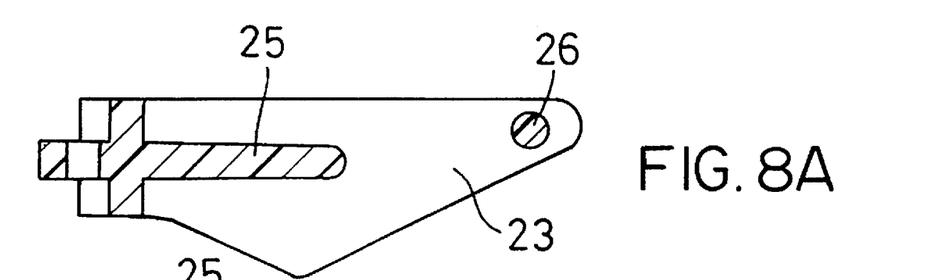
FIG. 8(a), (b) & (c) are views showing variations of the present embodiment.
Figures 8B, 8C:
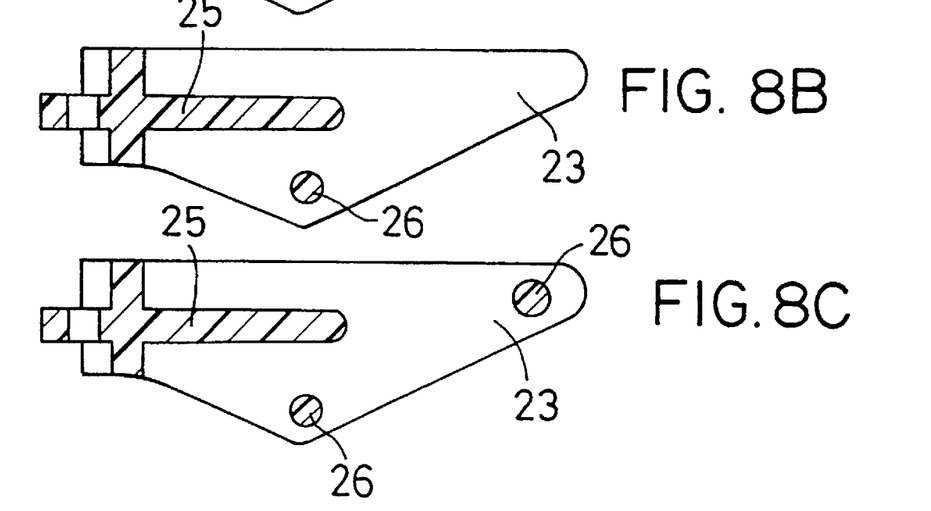

If required, the configuration of the projection 26 can be changed appropriately. For example, the projection 26 may be shaped into a cylinder, as shown in FIG. 7(A), or into a prism, as shown in FIG. 7(B). In either case, the engagement hole 18 is so configurated as to mesh with the projection 26. The respective positions of the projection 26 and engagement hole 18 can also be changed, provided that they correspond to each other. By way of example, FIGS. 8(A) and 8(B) show the case where the position in which the projection 26 is to be provided is not restricted so long as the projection 26 is provided on either one of the opposed faces of the holding pieces. Alternatively, a plurality of projections 26 may be provided, as shown in FIG. 8(C).

Figure 9:
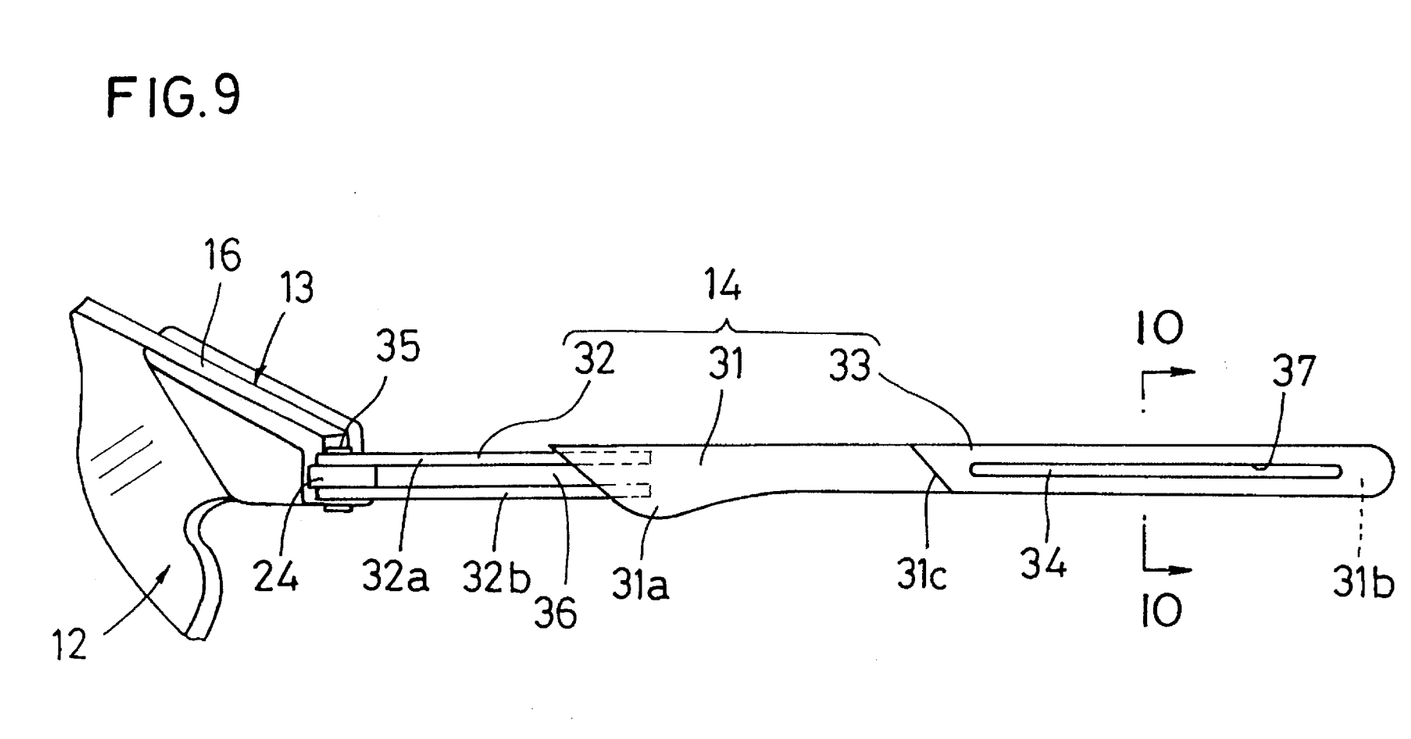
FIG. 9 is a view showing the structure of a temple.
Figure 10:
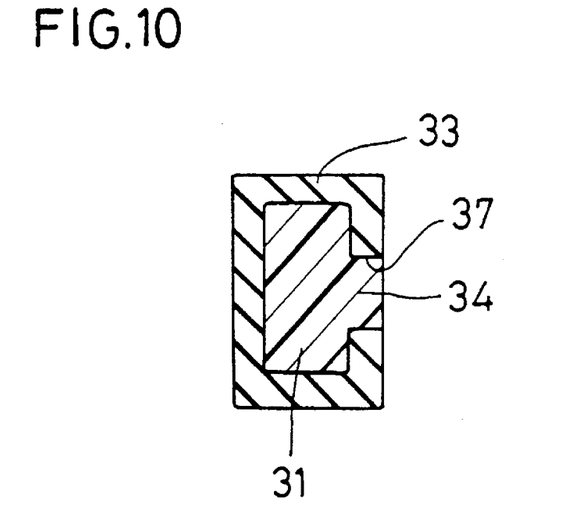
FIG. 10 is a cross section taken along the line 10—10 of FIG. 9.

To the frame 13 so constituted as to be mounted on the lens 12 described above is attached a temple 14, which is shown in FIG. 9. A cross section taken along the line 10—10 of FIG. 9 is shown in FIG. 10. The temple 14 comprises: a base 31; a frame attachment element 32; and a non-slip cover 33. The base 31 is composed of a rod which may be made of a synthetic resin and formed with an oblique step 31c in the vicinity of the center thereof. The base 31 is formed such that its portion positioned between one end 31a and the step 31c becomes slightly thicker than its portion positioned between the step 31c and the other end 31b. Between the step 31c and the other end 31b is formed an elongated protrusion 34 on one side face of the base 31.

The frame attachment element 32 may consists of, a pair of metal rods 32a and 32b. The respective ends of the rods 32a and 32b hold the above attachment element 24 from above and from below, respectively. The rods 32a and 32b are rotatably attached to the attachment element 24 by means of a fitting part 35 such as a hinge. The respective other ends of the rods 32a and 32b are fixed to the above one end 31a of the base 31 by for example an insert formation, thereby forming a vent hole 36 between the rods 32a and 32b.

Thus, with the vent hole 36 provided at least in the vicinity of the base end of the temple 14, ventilation around the user's face is improved, which considerably enhances the usability of the sunglasses 11.

The cover 33 is formed from an elastic material and, more preferably, it is formed from rubber. The cover 33 covers up the portion positioned between the step 31c and the other end 31b of the above base 31. One side face of the cover 33 is formed with a long hole 37 into which the elongated protrusion 34 is to be fitted. Consequently, in the operation of attaching the cover 33 to the base 31, the base 31 is fitted into the cover 33 more easily by elastically expanding the long hole 37. Once the cover 33 has been attached to the base, it is less likely to come off by accident, since the long hole 37 is engaged with the elongated protrusion 34. In addition, the elongated protrusion 34 appearing in a single line on one side face of the cover 33 is also advantageous in terms of design.

Preferably, the height of the elongated protrusion 34 and the thickness of the cover 33 are substantially equal in dimension such that the cover 33 attached to the base 31 becomes substantially flush with the elongated protrusion 34. It is also preferable that the step 31c of the base 31 is flush with the cover 33.

Figure 11:
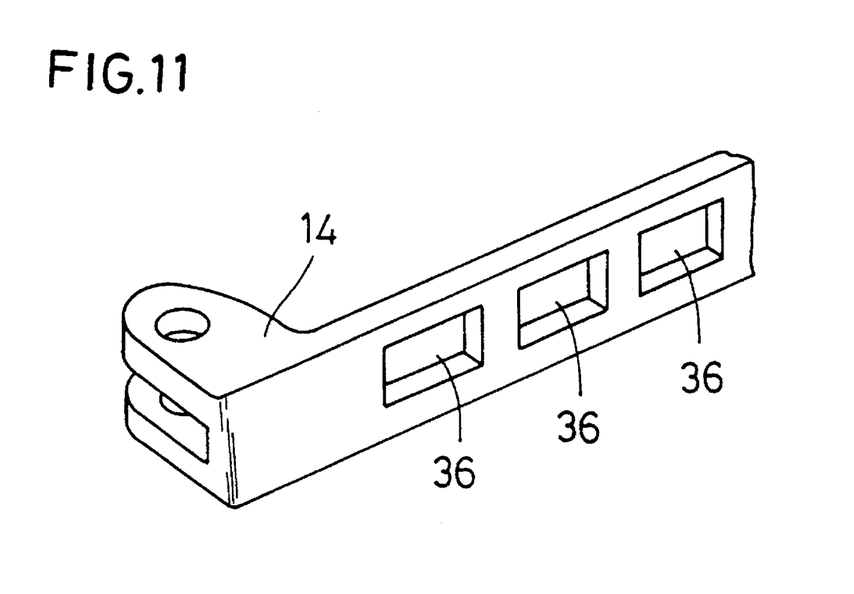
FIG. 11 is a view showing another variation of the present embodiment.

The vent hole 36 is not limited to the embodiment described above. For example, the vicinity of the base end of the temple 14 may be formed with a single vent hole 36 or a plurality of vent holes 36 in a given configuration, as shown in FIG. 11.

As described above, according to the present invention, frames can easily be attached to and detached from a lens. Moreover, once the frames have been attached to the lens, they can be held stably on the lens without being displaced or slipping off the lens. Furthermore, the sunglasses of the present invention are excellent in ventilation when worn by a user, while they are prevented from slipping down by the covers which can be easily attached thereto and detached therefrom. Therefore, the usability of the sunglasses are remarkably enhanced.

The present invention provides sunglasses which allow the lens thereof to be changed at any time and the frame thereof to be easily mounted and dismounted on and from the lens. Once the frame has been mounted on the lens, the frame can be held stably on the lens, resulting in sunglasses with enhanced ventilation and usability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Sunglasses comprising a lens of single-lens type made of a plastic resin, a pair of frames removably mounted on opposite upper side edges of said lens, and a pair of temples pivotally supported by said pair of respective frames, wherein:

said lens has an engagement long nick having an open outer end at each of said upper side edges of the lens and extending substantially horizontally and inwardly from the upper side edge, and an engagement hole independent of said engagement long nick;

said pair of frames are each provided with a pair of holding pieces which hold therebetween one of the upper side edges of the lens and between which are provided a projection removably engaging said engagement hole, and an elongated protrusion removably inserted into said engagement long nick; and said engagement long nick serves to guide said elongated protrusion substantially horizontally when the elongated protrusion is inserted into the engagement long nick.

2. Sunglasses according to claim 1, wherein said projection is substantially hemispherical in configuration.

3. Sunglasses according to claim 1, wherein said elongated protrusion extends with its tip reaching about a longitudinal midpoint of said holding pieces, and wherein said projection is located slightly closer to free ends of the holding pieces than to said tip of the elongated protrusion.

4. Sunglasses according to claim 1, wherein said projection is located in a position deviated from an extension line of said elongated protrusion.

5. Sunglasses according to claim 1, wherein said temples each have a base portion formed with at least one vent hole.

6. Sunglasses according to claim 1, wherein:

said temples each have a free end around which is removably fitted a non-slip cover made of an elastic material; said cover defines at its one side a long hole extending along the length of the corresponding temple; and said free end of each temple is formed with an elongated protrusion which is fitted into said long hole and is flush with an outer surface of the corresponding cover when the cover is fitted therearound.

7. Eyeglasses comprising:

a lens having a top edge and a pair of opposite side edges, said lens including an elongated engagement guide slot having an open outer end at one of said side edges of said lens, said elongated engagement guide slot extending substantially horizontally and inwardly from said one of said side edges; and an engagement hole located adjacent to said elongated engagement guide slot;

a frame removably mounted at said one of said side edges of said lens, said frame including a cut-away portion extending from a top edge of said frame to a bottom edge of said frame and forming a pair of spaced-apart holding pieces which hold therebetween said one of said side edges of said lens such that the top edge of the lens is substantially flush with the top edge of the frame;

a projection removably engagable with said engagement hole; and an elongated protrusion removably insertable into said elongated engagement guide slot, said elongated engagement guide slot guiding said elongated protrusion substantially horizontally when the elongated protrusion is inserted into the elongated engagement guide slot for aligning the projection with the engagement hole; and an earstem pivotally supported by said frame.

8. Eyeglasses according to claim 7, wherein said projection is substantially hemispherical in configuration.

9. Eyeglasses according to claim 7, wherein said elongated protrusion extends with its tip reaching about a longitudinal midpoint of said holding pieces, and wherein said projection is located slightly closer to free ends of the holding pieces than to said tip of the elongated protrusion.

10. Eyeglasses according to claim 7, wherein said projection is located in a position deviated from an extension line of said elongated protrusion.

11. Eyeglasses according to claim 7, wherein said earstem includes a base portion formed with at least one vent hole.

12. Eyeglasses according to claim 7, wherein:

said earstem includes a free end around which is removably fitted a non-slip cover made of an elastic material; said cover defines at its one side a long hole extending along the length of the corresponding earstem; and said free end of said earstem is formed with an elongated protrusion which is fitted into said long hole and is flush with an outer surface of the corresponding cover when the cover is fitted therearound.

13. Eyeglasses according to claim 7, wherein said projection is substantially cylindrical in configuration.

14. Eyeglasses according to claim 7, wherein said projection is substantially rectangular in configuration.

15. Eyeglasses according to claim 7, wherein said elongated protrusion is substantially rectangular in configuration.

16. Eyeglasses according to claim 7, wherein said elongated protrusion is substantially triangular in configuration.

17. Eyeglasses according to claim 7, further comprising a second elongated protrusion provided on said frame for engagement with a corresponding second elongated engagement guide slot provided in said lens.

18. Eyeglasses according to claim 7, further comprising a second projection provided on said frame for engagement with a corresponding second engagement hole provided in said lens.

19. Eyeglasses according to claim 7, wherein said projection is located below said elongated protrusion, said projection being farther away from said top edge of said frame than said elongated protrusion.

20. Eyeglasses according to claim 7, wherein said elongated protrusion extends substantially parallel with said top edge of said frame.

* * * * *